(12) United States Patent
Choi

(10) Patent No.: US 7,410,678 B2
(45) Date of Patent: *Aug. 12, 2008

(54) LIQUID CRYSTAL DISPLAY USING FERROELECTRIC LIQUID CRYSTAL, AND FABRICATION METHOD THEREOF

(75) Inventor: Su Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 385 days.

This patent is subject to a terminal disclaimer.

(21) Appl. No.: 11/157,791

(22) Filed: Jun. 22, 2005

(65) Prior Publication Data

US 2006/0023148 A1 Feb. 2, 2006

(30) Foreign Application Priority Data

Jul. 30, 2004 (KR) .................. 10-2004-0060486

(51) Int. Cl.
*C09K 19/00* (2006.01)
*G02F 1/135* (2006.01)

(52) U.S. Cl. .................. 428/1.1; 349/172; 349/177
(58) Field of Classification Search .................. 428/1.1; 349/168, 171, 172, 177
See application file for complete search history.

(56) References Cited

U.S. PATENT DOCUMENTS

2005/0140904 A1* 6/2005 Choi .................. 349/141
2005/0179855 A1* 8/2005 Helgee et al. .................. 349/172
2005/0213019 A1* 9/2005 Choi et al. .................. 349/172

FOREIGN PATENT DOCUMENTS

WO   WO 2003081327   * 10/2003

* cited by examiner

*Primary Examiner*—Shean C Wu
(74) *Attorney, Agent, or Firm*—Birch, Stewart, Kolasch & Birch, LLP

(57) ABSTRACT

A liquid crystal display utilizes ferroelectric liquid crystals in its construction. The liquid crystal display includes a first substrate, a first alignment layer over the first substrate, and a first ferroelectric liquid crystal layer over the first alignment layer, which has a polarity in a first direction. A second substrate faces the first substrate, a second alignment layer is over the second substrate, and a second ferroelectric liquid crystal layer is over the second alignment layer. Both ferroelectric layers have and a polarity in the same direction.

16 Claims, 14 Drawing Sheets

LIQUID CRYSTAL DISPLAY USING FERROELECTRIC LIQUID CRYSTAL, AND FABRICATION METHOD THEREOF

This application claims priority under 35 U.S.C. § 119 of Korean application no. 10-2004-0060486, filed Jul. 30, 2004, which is herein fully incorporated by reference.

BACKGROUND OF THE INVENTION

1. Field of the Invention

A liquid crystal display containing a ferroelectric liquid crystal material, and a fabrication method thereof.

2. Description of the Related Art

Liquid crystal displays are one type of flat panel displays that have attracted continuous attention in recent years. Liquid crystal displays operate by varying the optical anisotropy of liquid crystals by applying an electric field to a liquid crystalline material that combines the fluidity of liquid and the optical property of crystal. Liquid crystal displays currently find wide use due to their low power consumption, small volume, large size and high definition, when compared with a conventional cathode ray tube.

A liquid crystal display can be set in various alignment modes using the properties and the alignment pattern of the liquid crystal. A typical liquid crystal display is a twisted nematic (TN) liquid crystal display.

In a TN liquid crystal display, a liquid crystal director is arranged and twisted at 90.degree. between upper/lower substrates, and this director is controlled by applied voltage. When no electric field is applied, the TN liquid crystal display has a maximum transmittance in upper and lower directions, and has a symmetric direction of the viewing angle. When an electric field is applied, liquid crystal molecules gradually align in parallel with the direction of the electric field if the liquid crystal molecules have a positive dielectric anisotropy. When greater voltages are applied between the substrates, the liquid crystal molecules rearrange in the direction of the electric field, thereby having a polar angle of 90.degree. and being aligned normal with and between the upper and lower substrates. Accordingly, the TN liquid crystal display has a drawback in that it cannot realize a wide viewing angle due to a contrast ratio (C/R) and a luminance that greatly varies with the viewing angle.

Several ways have been proposed to overcome the drawbacks of inadequate viewing angle resulting from a vertical electric field. Among of them, an in-plane switching liquid crystal display is typical.

FIG. 1 shows a sectional view illustrating the variation of a molecular arrangement of a liquid crystal with ON/OFF voltages in a related art liquid crystal display.

As shown in FIG. 1, when no voltage is applied (OFF) to a pixel electrode 21 and a common electrode 22, liquid crystal molecules 5 align in parallel with the pixel electrode 21 and the common electrode 22.

When voltage is applied (ON) to the pixel electrode 21 and the common electrode 22, an in-plane electric field 60 forms between the pixel electrode 21 and the common electrode 22, and the liquid crystal molecules 5 horizontally align along the in-plane electric field 60.

However, the related art in-plane switching liquid crystal display has disadvantages arising from the aperture ratio and the transmittance of light radiated from a bottom light source deteriorating because the liquid crystal display panel's lower substrate 1 bears all of the pixel electrode 21, the common electrode 22 and their electrode wires (not shown) necessary generate the in-plane electric field 60. In contrast, the upper substrate 2 has no obstructions of this type. Therefore, obtaining sufficient luminance becomes difficult in the related art in-plane switching liquid crystal panel. In contrast, the upper substrate 2 is unobstructed.

FIG. 2 shows a partially enlarged sectional view of a related art liquid crystal display having a ferroelectric liquid crystal coated on an alignment layer of an underlying lower substrate.

As shown in FIG. 2, an alignment layer 111 is coated on the lower substrate 101, and a ferroelectric liquid crystal 141 is coated on the alignment layer 111. After coating, the ferroelectric liquid crystal 141 undergoes a phase transition to form a ferroelectric liquid crystal layer 141.

The ferroelectric liquid crystal 141 expresses a spontaneous polarization during its phase transition. The expressed spontaneous polarization has a strong polarity due to its high electron density. Therefore, the ferroelectric liquid crystal 141 is coated on the alignment layer 111 of the underlying lower substrate 101.

In the liquid crystal display having the coated ferroelectric liquid crystal 141, the ferroelectric liquid crystal undergoes a phase transition while exposed to air. However, the ferroelectric liquid crystal 141 is not exposed to air at the alignment layer 111.

When the liquid crystal expresses its spontaneous polarization, the liquid crystal has a rotation direction toward the lower substrate 101 due to the strong polarity of the expressed spontaneous polarization, the non-polarity of the air, and the relative polarity of the alignment layer.

FIG. 3 illustrates a schematic enlarged sectional view of a portion of a related art liquid crystal display using a ferroelectric liquid crystal. As shown in FIG. 3, lower and upper substrates 101 and 102 respectively have ferroelectric liquid crystal layers 141 and 142 of FIG. 2. When a bulk nematic liquid crystal 200 is injected between the attached lower and upper substrates 101 and 102 having alignment layers 111 and 112, ferroelectric liquid crystals 141a and 142a stabilize their rotations respective to each other due to their reverse rotation directions.

FIG. 4 shows defects of the related art liquid crystal display containing a ferroelectric liquid crystal.

FIG. 4 shows a related art ferroelectric liquid crystal display that includes a lower substrate 101 having a first alignment layer 111 and a first ferroelectric liquid crystal layer 141 that has passed though a phase transition. The upper substrate 102 attaches to the lower substrate 101 and has a second alignment layer 112 and a second ferroelectric liquid crystal layer 142 that has also passed through a phase transition. A bulk nematic liquid crystal 200 is injected between the attached lower and upper substrates 101 and 102.

As shown in FIG. 4, the related art liquid crystal display includes an effective phase delay layer 201 and a rotation restraint layer 203 that are respectively influenced by the alignments of the first and second ferroelectric liquid crystal layers 141 and 142 when a voltage is applied.

The effective phase delay layer 201 and the rotation restraint layer 203 tend to rotate in opposite directions. That is, the effective phase delay layer 201 and the rotation restraint layer 203 have reverse rotations.

In other words, a reverse rotation force of the rotation restraint layer 203 is applied against a forward rotation force of the effective phase delay layer 201, and the liquid crystal 200 does not rotate in the direction of the electric field to thus make its rotation state unstable.

FIG. 5 is a graph illustrating the disadvantageous and defective transmittance and a response speed in the related art liquid crystal display of FIG. 4.

As shown in FIG. 5, the X-axis denotes time in milliseconds (ms), and the Y-axis denotes a relative transmittance in percentage (%). A solid line denotes the transmittance when a voltage is applied (ON), and a dotted line denotes the transmittance when no voltage is applied (OFF).

When no voltage is applied (OFF) to the liquid crystal display, the liquid crystal display cannot be distinguished from other liquid crystal displays in FIG. 5. However, when voltage is applied (ON) to the liquid crystal display, the transmittance versus time shows oscillating switching.

In other words, the related art liquid crystal display has drawbacks arising from the liquid crystal being primarily, i.e., forward rotated and then reverse rotated by a fixed force. The interaction of the two rotation forces serves to deteriorate the luminance. Also, when the liquid crystal again rotates in response to another switching signal, this rotation prevents an effective phase delay and causes a slow response speed. As a result, the related art ferroelectric liquid crystal displays show distinct disadvantages that limit their effectiveness in modern display applications.

SUMMARY OF THE INVENTION

Accordingly, the invention is, in part, directed to a liquid crystal display using a ferroelectric liquid crystal and a fabrication method thereof that substantially obviates one or more problems due to the limitations and disadvantages of the related art.

An object of the invention, in part, is to provide a liquid crystal display having ferroelectric liquid crystal layers provided at a top and a bottom of a liquid crystal layer, for improving a phase delay effect and a response speed by rotating upper and lower ferroelectric liquid crystals in the same direction, and a fabrication method thereof.

The invention, in part, pertains to a liquid crystal display that includes a first substrate; a first alignment layer over the first substrate; a first ferroelectric liquid crystal layer over the first alignment layer, and having a polarity in a first direction; a second substrate facing the first substrate; a second alignment layer over the second substrate; a second ferroelectric liquid crystal layer over the second alignment layer, and having a polarity in the same direction as the first ferroelectric liquid crystal layer; and a third liquid crystal layer formed between the first ferroelectric liquid crystal layer and the second ferroelectric liquid crystal layer.

In the invention, the first substrate may have a pixel electrode, and the second substrate may have a common electrode. The first and second ferroelectric liquid crystal layers may have a phase transition from a chiral smectic C (SmC*) phase to a chiral nematic (N*) phase when the temperature is raised. The first and second ferroelectric liquid crystal layers may have a phase transition from a chiral smectic C (SmC*) phase to a smectic A (SmA) phase when the temperature is raised. The third liquid crystal layer may be formed of bulk nematic liquid crystal. The third liquid crystal layer may have a phase transition from a nematic phase to an isotropic phase when the temperature is raised. The first and second ferroelectric liquid crystal layers may have chiral smectic C (SmC*) phases at a temperature of $T_1$ at which the third liquid crystal layer has a phase transition from a chiral nematic (N*) phase to an isotropic phase. The first and second ferroelectric liquid crystal layers may have a phase transition from the chiral smectic C (SmC*) phase to a chiral nematic (N*) phase at a temperature $T_2$ higher than the temperature of $T_1$. The first and second ferroelectric liquid crystal layers may have a phase transition from the chiral smectic C (SmC*) phase to a smectic A (SmA) phase at a temperature $T_2$ higher than the temperature of $T_1$.

The invention, in part, pertains to a method for fabricating a liquid crystal display that includes forming first and second alignment layers over first and second substrates, respectively; forming first and second ferroelectric liquid crystal layers over the first and second alignment layers, respectively; and filling a third liquid crystal layer between the first and second substrates to form a liquid crystal panel. The liquid crystal panel is heated to a temperature of $T_1$ to cause a phase transition of the first and second ferroelectric liquid crystal layers to nematic liquid crystal layers and phase-transit the third liquid crystal layer to an isotropic liquid crystal layer. The liquid crystal panel is cooled to a temperature $T_2$ while applying a direct current voltage to the liquid crystal panel, to cause a phase transition of the first and second ferroelectric liquid crystal layers from a chiral nematic (N*) phase to a chiral smectic C (SmC*) phase and maintain the third liquid crystal layer in an isotropic phase. Cooling the liquid crystal panel to a temperature of $T_3$ maintains the first and second ferroelectric liquid crystal layers in the chiral smectic C (SmC*) phase and causes a phase transition of the third liquid crystal layer from the isotropic phase to the chiral nematic (N*) phase.

In the invention, the liquid crystal panel, when cooled to the temperature $T_2$ and has a direct current voltage applied thereto, may have the applied direct current voltage being up to 10 volts. The first substrate may have a pixel electrode, and the second substrate may have a common electrode. When the liquid crystal panel is cooled to the temperature of $T_2$ and has a direct current voltage applied thereto, the first and second ferroelectric liquid crystal layers may have polarities in the same direction.

The invention, in part, pertains to a method for fabricating a liquid crystal display that includes forming first and second alignment layers over first and second substrates, respectively; forming first and second ferroelectric liquid crystal layers over the first and second alignment layers, respectively; and filling a third liquid crystal layer between the first and second substrates to form a liquid crystal panel. Heating the liquid crystal panel to a temperature of $T_1$ causes a phase transition of the first and second ferroelectric liquid crystal layers to smectic A (SmA) liquid crystal layers and a phase transition of the third liquid crystal layer to an isotropic liquid crystal layer. Cooling the liquid crystal panel to a temperature of $T_2$, while applying a direct current voltage to the liquid crystal panel, causes a phase transition of the first and second ferroelectric liquid crystal layers from a smectic A (SmA) phase to a chiral smectic C (SmC*) phase and maintains the third liquid crystal layer in an isotropic phase. Cooling the liquid crystal panel to a temperature of $T_3$ maintains the first and second ferroelectric liquid crystal layers in the chiral smectic C (SmC*) phase and causes a phase transition of the third liquid crystal layer from the isotropic phase to the chiral nematic (N*) phase.

In the invention, when the liquid crystal panel is cooled to the temperature of $T_2$ and has the direct current voltage applied thereto, the applied direct current voltage may be up to 10 volts. The first substrate may have a pixel electrode, and the second substrate may have a common electrode. When the liquid crystal panel is cooled to the temperature $T_2$ and has a direct current voltage applied thereto, the first and second ferroelectric liquid crystal layers may have polarities in the same direction.

It is to be understood that both the foregoing general description and the following detailed description of the invention are exemplary and explanatory and are intended to provide further explanation of the invention as claimed. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings

BRIEF DESCRIPTION OF THE DRAWINGS

The accompanying drawings are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 6A:
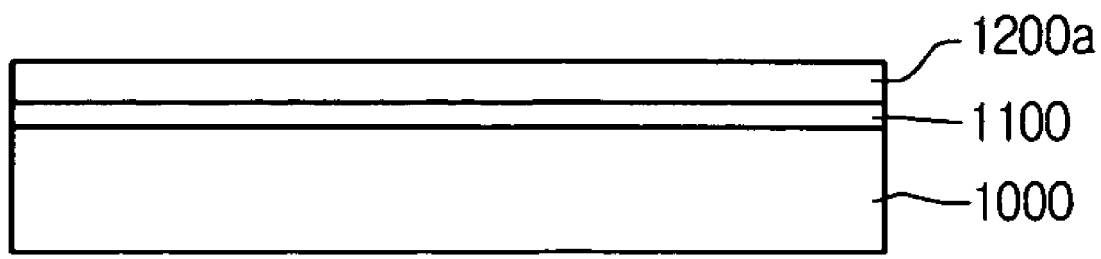
FIG. 6A shows a sectional view illustrating a liquid crystal panel having a ferroelectric liquid crystal according to a preferred embodiment of the invention.

FIG. 6A shows a sectional view illustrating a liquid crystal panel having a ferroelectric liquid crystal layer coated on an alignment layer according to a preferred embodiment of the invention.

FIG. 6A shows a first alignment layer 1100 being formed over a lower substrate 1000 having a gate wire, a data wire and the like. Next, a ferroelectric chiral smectic C (SmC*) liquid crystal layer 1200a is coated over the first alignment layer 1100. The molecules in chiral smectic C liquid crystals characteristically have a tilted orientation to yield a biaxial symmetry.

Figure 6B:
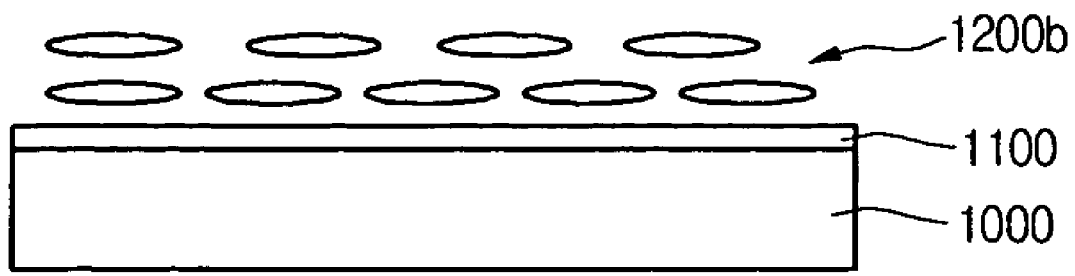
FIG. 6B shows a sectional view illustrating a liquid crystal panel having a phase-transited ferroelectric liquid crystal according to a preferred embodiment of the invention.

Then, the construction is heated to a temperature sufficient to cause a phase transition in the ferroelectric chiral smectic C (SmC*) liquid crystal layer 1200a to a chiral nematic (N*) liquid crystal layer 1200b. Accordingly, as shown in FIG. 6B, the ferroelectric chiral smectic C (SmC*) liquid crystal layer 1200a has undergone a phase transition to a chiral nematic (N*) liquid crystal layer 1200b that does not have a spontaneous polarization.

Figure 6C:
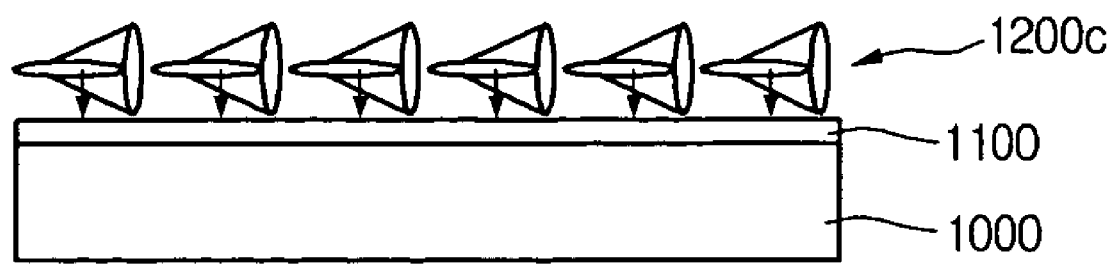
FIG. 6C shows a sectional view illustrating a liquid crystal panel having a phase transition completed ferroelectric liquid crystal according to a preferred embodiment of the invention.

Next, as shown in FIG. 6C, when the construction is cooled to a low temperature, and the chiral nematic (N*) liquid crystal layer 1200b undergoes a phase transition to a ferroelectric chiral smectic C (SmC*) liquid crystal layer 1200c.

During the phase transition process, the chiral nematic (N*) liquid crystal layer 1200b not having a spontaneous polarization is changed to a ferroelectric chiral smectic C (SmC*) liquid crystal layer 1200c having spontaneous polarization.

When the ferroelectric liquid crystal layer 1200c, which has spontaneous polarization, is exposed between air and the alignment layer 1100 and expresses the spontaneous polarization, it then has a rotation direction toward the alignment layer 1100 due to the non-polarity of the air and the relative polarity of the alignment layer 1100.

Figure 6D:
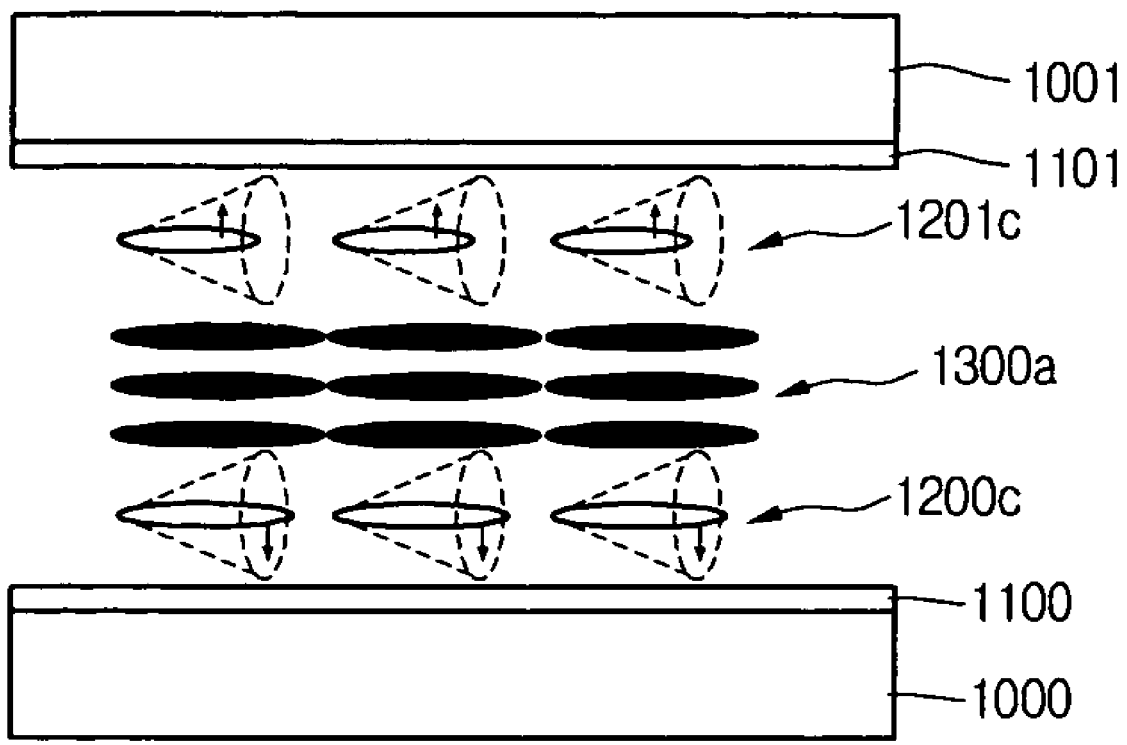
FIG. 6D shows a sectional view illustrating the rotation direction of a post-phase transition ferroelectric liquid crystal according to a preferred embodiment of the invention.

FIG. 6D shows a sectional view illustrating the rotation direction of the phase-transition completed ferroelectric liquid crystal layer according to a preferred embodiment of the invention.

As shown in FIG. 6D, a second alignment layer 1101 has formed on an upper substrate 1001. Then, a ferroelectric chiral smectic C (SmC*) liquid crystal layer 1201c is formed over the second alignment layer 1101. After that, the resulting lower and upper substrates 1000 and 1001 are attached.

A bulk nematic liquid crystal 1300a is injected into a cell gap between the upper and lower substrates 1000 and 1001, and the result is a completed the liquid crystal display using the first and second ferroelectric liquid crystals 1200c and 1201c. However, the first and second ferroelectric liquid crystals 1200c and 1201c have rotation directions, resulting from the spontaneous polarization, that are opposite to each other.

Figure 1:
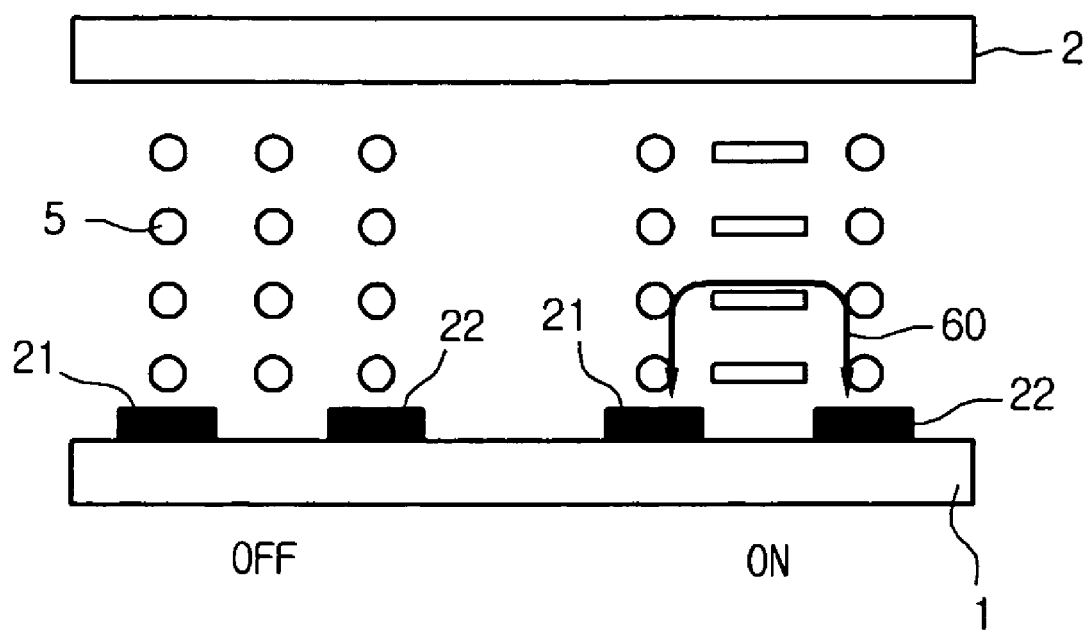
FIG. 1 shows a sectional view illustrating a variation of the molecular arrangement of liquid crystals at ON/OFF voltages in a related art liquid crystal display.
Figure 2:
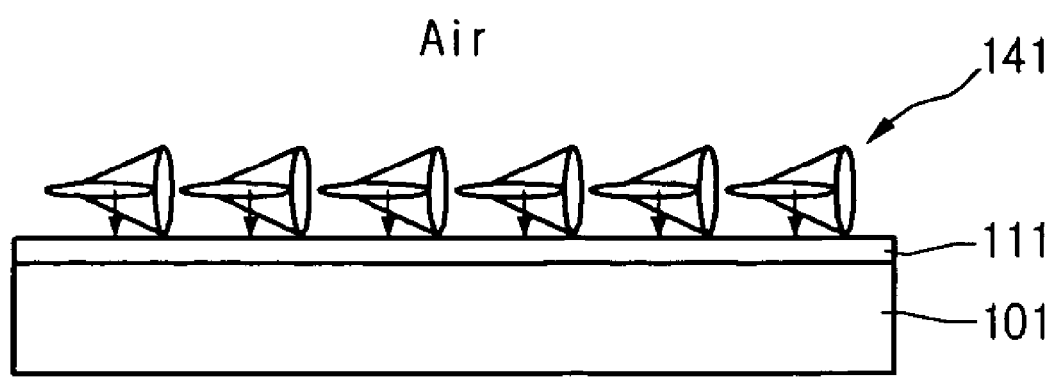
FIG. 2 shows a partially enlarged sectional view illustrating a related art liquid crystal display incorporating a ferroelectric liquid crystal.
Figure 3:
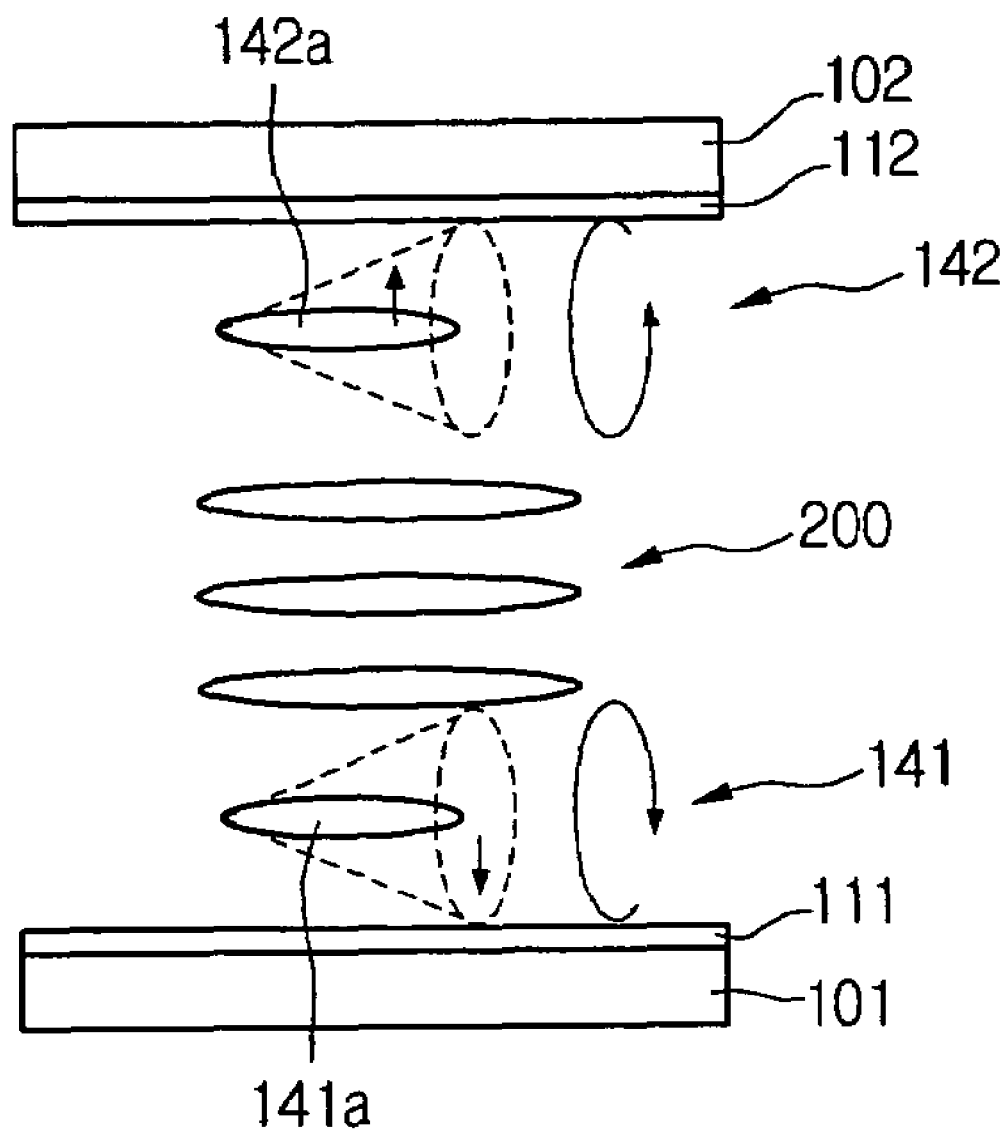
FIG. 3 shows a schematic enlarged sectional view illustrating a portion of a related art liquid crystal display using a ferroelectric liquid crystal.
Figure 4:
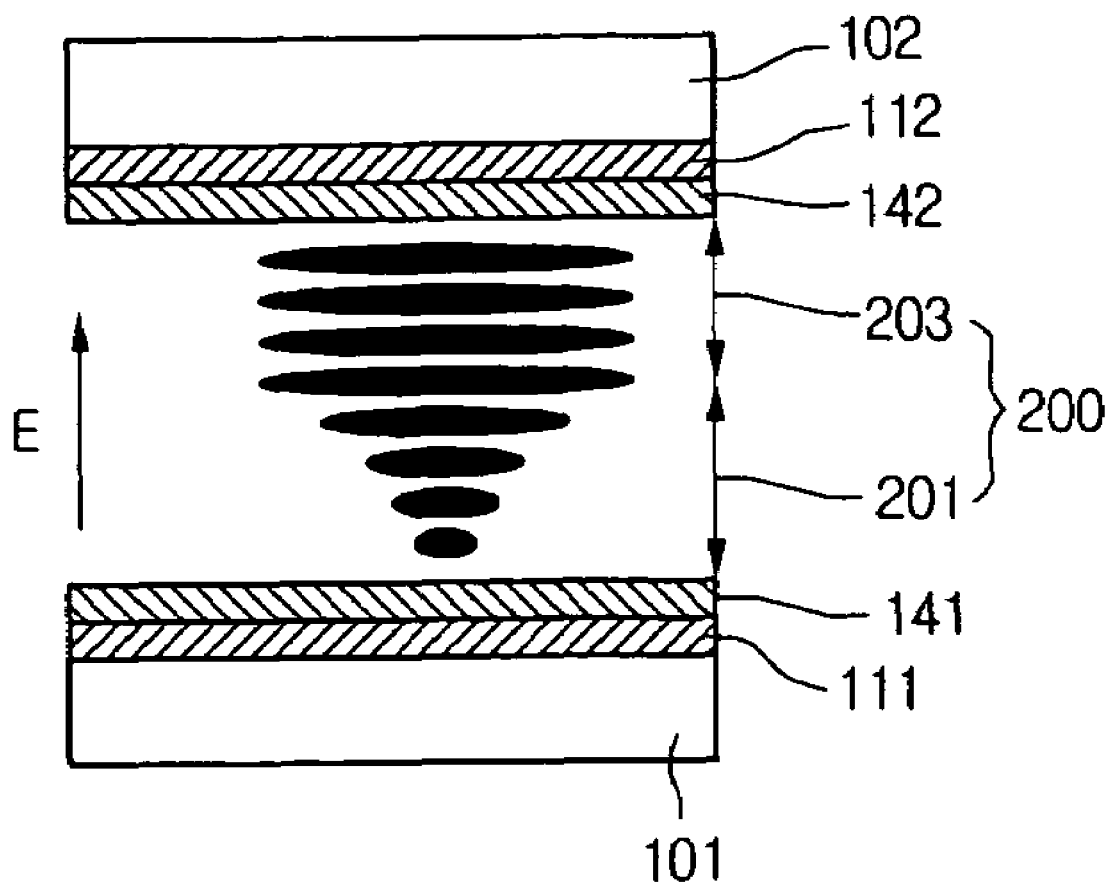
FIG. 4 shows a sectional view illustrating disadvantages of a related art liquid crystal display incorporating a ferroelectric liquid crystal.
Figure 5:
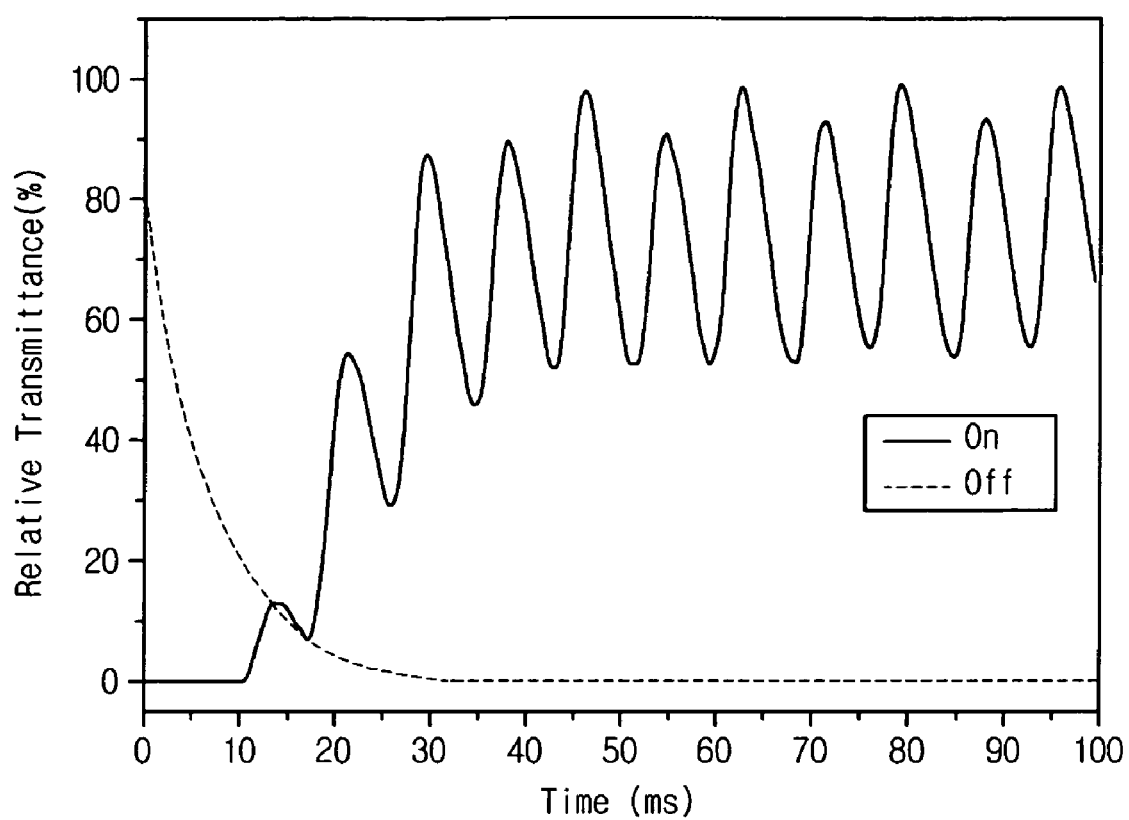
FIG. 5 shows a graph illustrating disadvantageous transmittance and response speed in the related art liquid crystal display of FIG. 4.

The liquid crystal display of FIG. 6D may be compared with the related art liquid crystal display of FIG. 4. In other words, the related art liquid crystal display of FIG. 4 has an effective phase delay layer 201 and a rotation restraint layer 203 respectively influenced from first and second ferroelectric liquid crystal layers 141 and 142 to have a reverse rotation with respect to each other. Accordingly, the reverse rotation force of the rotation restraint layer 203 against the rotation force of the effective phase delay layer 201 causes the liquid crystal 200 to not rotate in the direction of an electric field, thus making its rotation state unstable. As a result, the effective phase delay layer 201 and the rotation restraint layer 203 disrupt, i.e., cancel out their rotations with respect to each other.

In order to overcome the disadvantages of the related art liquid crystal display discussed above, alternative processing is performed in the inventive liquid crystal display.

Figure 6E:
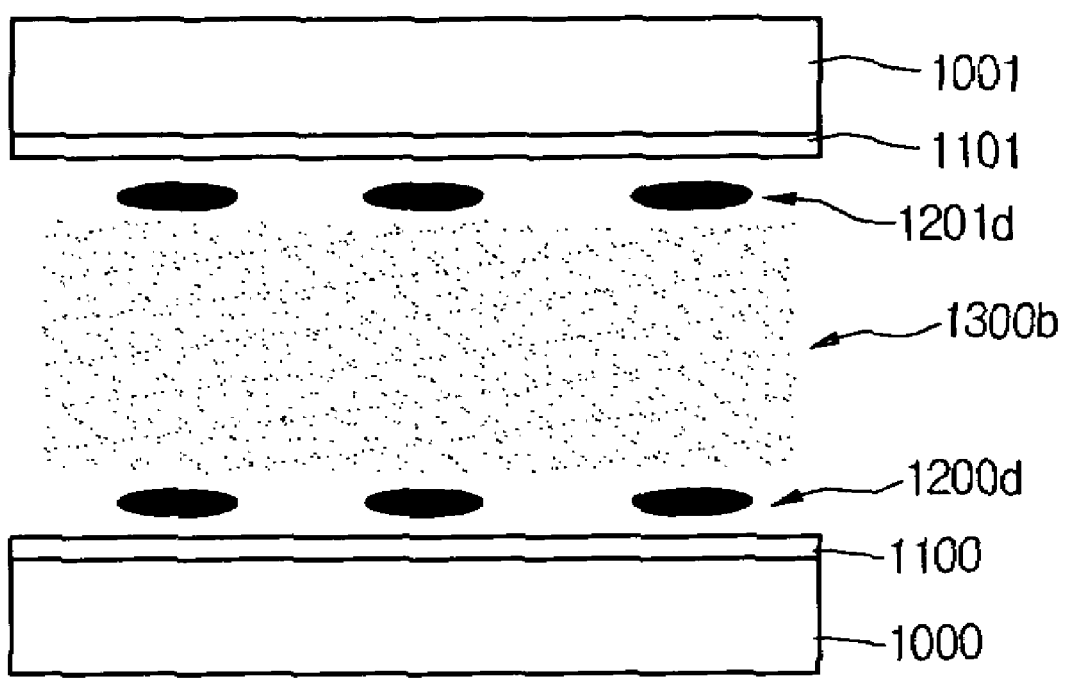
FIG. 6E shows a sectional view illustrating a process of a phase re-transition of a ferroelectric liquid crystal according to a preferred embodiment of the invention.

FIG. 6E shows a sectional view illustrating a process of a phase re-transition according to a preferred embodiment of the invention.

First, the first and second ferroelectric liquid crystal layers 1200c and 1201c, which have opposite rotation directions resulting from their spontaneous polarization, are subjected to an additional phase transition in order to obtain the same rotation direction for both layers.

FIG. 6E shows the resultant ferroelectric liquid crystal layers 1200c and 1201c being heated to a sufficient temperature to obtain a phase transition to chiral nematic (N*) liquid crystal layers 1200d and 1201d.

At this time, a suitable liquid crystal is selected to maintain the ferroelectric liquid crystal layers 1200c and 1201c at a $T_{n \to i}$ temperature of a bulk nematic liquid crystal layer 1300a. That is, a temperature for the phase transition $T_{n \to i}$ of the bulk nematic liquid crystal layers 1200d and 1201d to an isotropic liquid crystal layer 1300b, and the phase transition temperature $T_2$ of the ferroelectric chiral smectic C (SmC*) liquid crystal layers 1200c and 1201c to the chiral nematic (N*) liquid crystal layers 1200d and 1201d, have the relationship that $T_2$ is greater than $T_{n \to i}$.

Accordingly, when the temperature is raised to $T_2$, the ferroelectric chiral smectic C (SmC*) liquid crystal layers 1200c and 1201c undergo a phase transition to chiral nematic (N*) liquid crystal layers 1200d and 1201d based.

At the temperature $T_2$, the bulk nematic liquid crystal layer 1300a in the cell gap between the attached upper/lower substrates 1000 and 1001 undergoes a phase transition to an isotropic liquid crystal layer 1300b.

Below is a description of the rationale for sending the ferroelectric chiral smectic C (SmC*) liquid crystal layers 1200c and 1201c through a phase transition to the chiral nematic (N*) liquid crystal layers 1200d and 1201d at the interface between the alignment layers 1100 and 1101.

The chiral nematic (N*) liquid crystal layers 1200d and 1201d (which have gone through a phase transition) do not have the spontaneous polarizations.

Accordingly, the chiral nematic (N*) liquid crystal layers 1200d and 1201d have no orientation. Therefore, the chiral nematic (N*) liquid crystal layers 1200d and 1201d are in a state where their orientations can be influenced from a peripheral electric field.

Figure 6F:
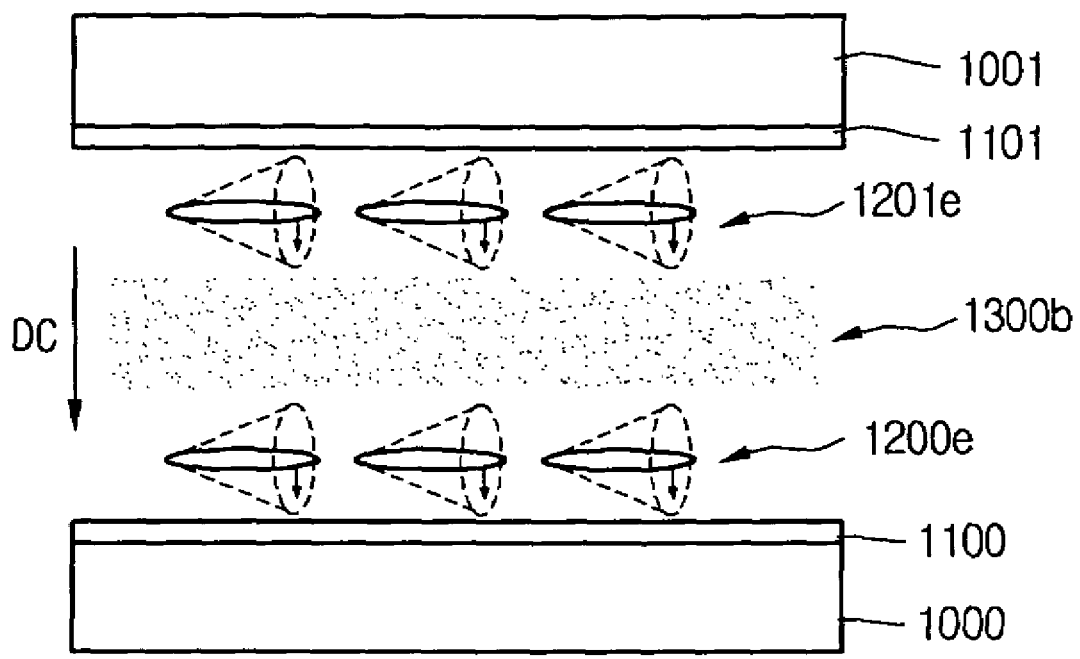
FIG. 6F shows a sectional view illustrating a process of applying direct current during a phase re-transition according to a preferred embodiment of the invention.

With the liquid crystals in this state (nematic), as shown in FIG. 6F, an electric field is applied across the device. FIG. 6F shows a sectional view illustrating a process of applying direct current during a phase re-transition.

In FIG. 6F, when the chiral nematic (N*) liquid crystal layers 1200d and 1201d are cooled and have direct current applied, they again undergo a phase transition to ferroelectric chiral smectic C (SmC*) liquid crystal layers 1200e and 1201e, but now they have the same rotation direction.

In other words, when the chiral nematic (N*) liquid crystal layers 1200d and 1201d, which do not express spontaneous polarization, are cooled and have applied direct current voltages flowing in the same direction, they undergo a phase transition to the ferroelectric liquid crystal layers 1200e and 1201e expressing a spontaneous polarization. For example, the applied direct current voltage is controlled up to 10 voltages.

As described above, when the chiral nematic (N*) liquid crystal layers 1200d and 1201d are cooled while having applied direct current voltages, they undergo a phase transition to the ferroelectric liquid crystal layers 1200e and 1201e to thus express spontaneous polarization having the same rotation direction resulting from the application of direct current voltage.

In other words, when a positive (+) direct current voltage is applied to a data pad, liquid crystal molecules are arranged to have positive spontaneous polarizations, and when a negative (−) direct current voltage is applied to the data pad, the liquid crystal molecules are arranged to have negative spontaneous polarizations.

In FIG. 6F, the isotropic liquid crystal layer 1300b is cooled to a temperature that does not cause a phase transition to the bulk nematic liquid crystal layer 1300a. Therefore, the isotropic liquid crystal layer 1300b is in an isotropic state prior to transition to other anisotropic phases.

Figure 6G:
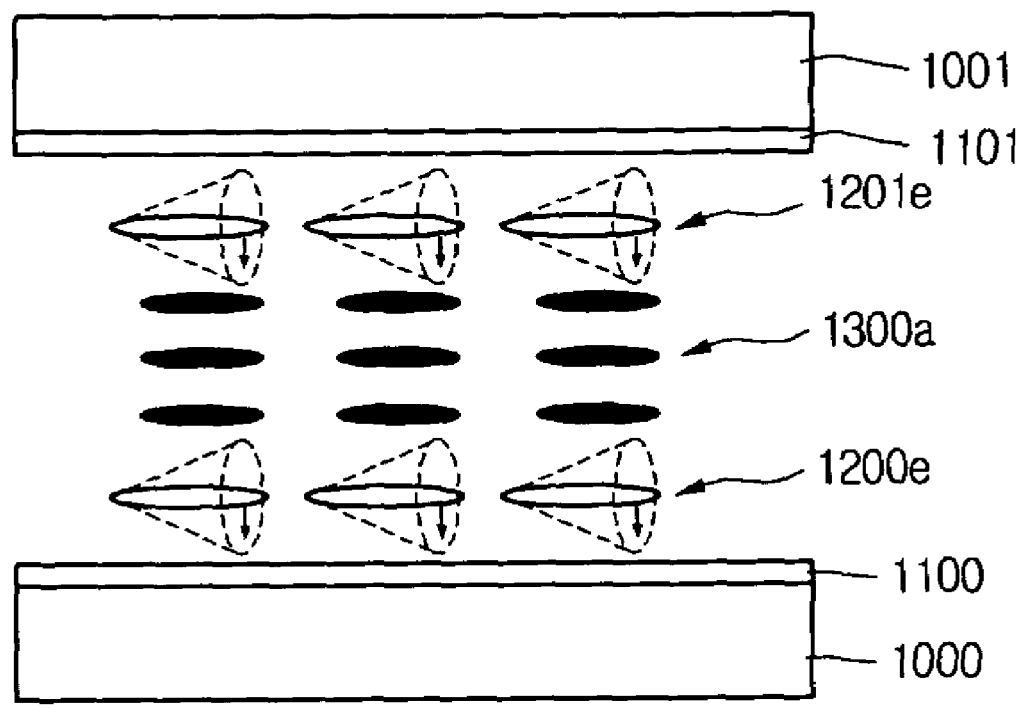
FIG. 6G shows a sectional view illustrating the back-end processing for fabricating a liquid crystal panel according to a preferred embodiment of the invention.

FIG. 6G shows the resultant display being cooled at the room temperature to induce a phase transition of the isotropic liquid crystal layer 1300b to the bulk nematic liquid crystal layer 1300a.

As a result, there is a liquid crystal display using the ferroelectric liquid crystal cooled at the room temperature. The liquid crystal display includes the ferroelectric liquid crystal layers 1200e and 1201e having the same rotation direction provided at the interface of the alignment layers 1100 and 1101, and the bulk nematic liquid crystal layer 1300a provided in the cell gap.

The above description exemplifies a case where the ferroelectric liquid crystal is selected to have a phase transition from a chiral smectic C (SmC*) phase to a nematic phase based on raising the temperature. However, another type of ferroelectric liquid crystal can also be used if it has a phase transition from the chiral smectic C (SmC*) phase to a smectic A (SmA) when the temperature is raised. Smectic A phases have a layer structure with perpendicular molecules, without further order inside the layer.

Figure 7A:
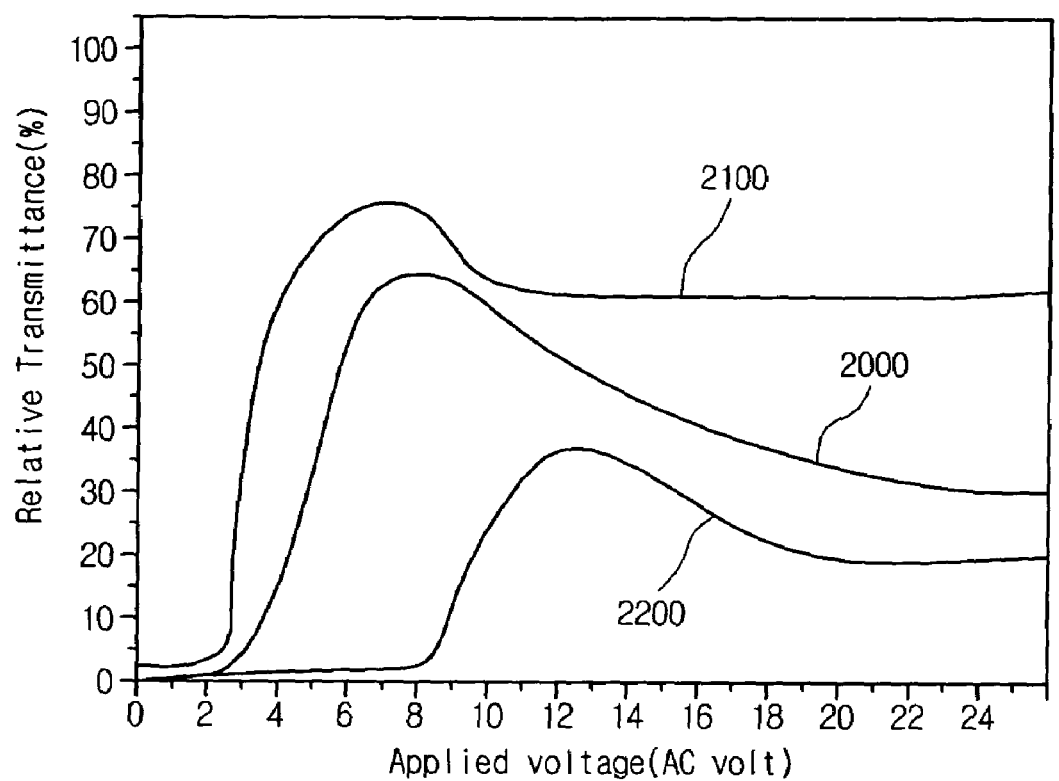
FIG. 7A shows a graph illustrating transmittance in a liquid crystal display according to a preferred embodiment of the invention.
Figure 7B:
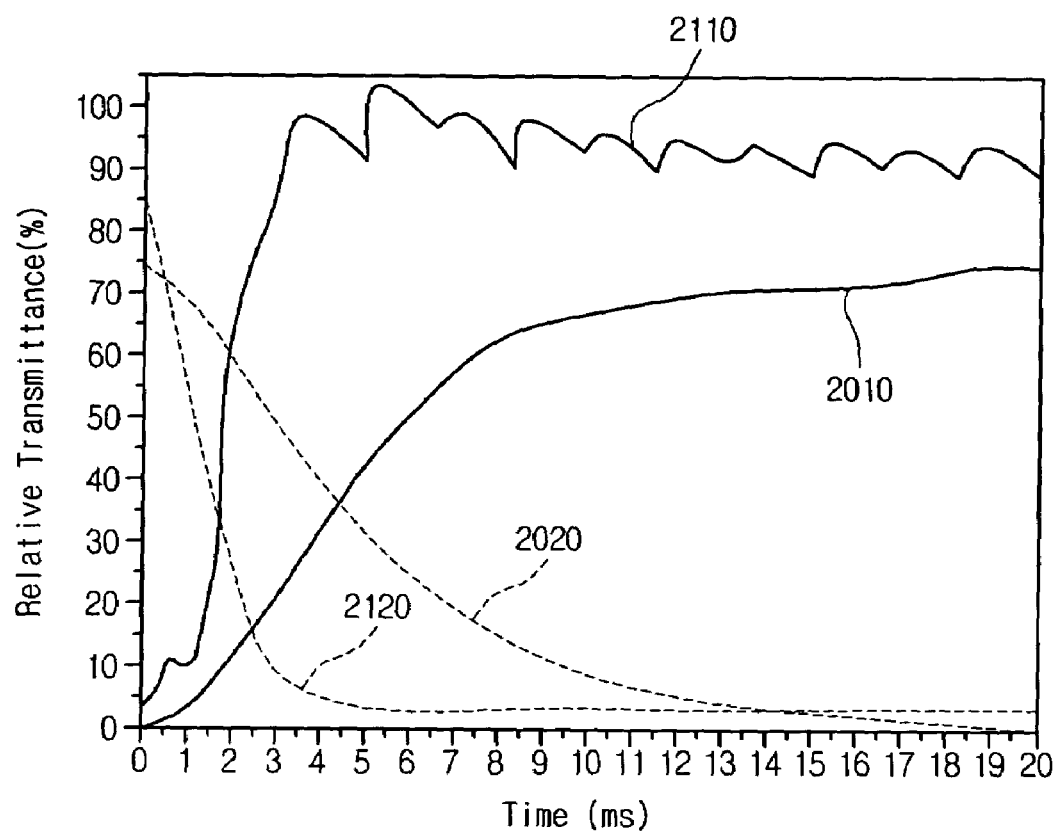
FIG. 7B shows a graph illustrating a response time in a liquid crystal display according to a preferred embodiment of the invention.

FIGS. 7A and 7B are graphs illustrating the transmittance and the response speed in a liquid crystal display according to a preferred embodiment of the invention.

In FIG. 7A, the X-axis denotes an applied voltage, and the Y-axis denotes a relative transmittance based on percentage (%) The solid lines show the relationship between relative transmittance and applied voltage.

In a related art liquid crystal display such as shown in FIG. 4, where the ferroelectric liquid crystal layers formed on the lower and upper substrates have different rotation directions, the effective phase delay layer 201 is influenced by the ferroelectric liquid crystal 141 formed on the lower substrate 101, and the rotation restraint layer 203 is influenced by the ferroelectric liquid crystal 142 formed on the upper substrate 102.

The rotation restraint layer 203 does not facilitate the rotation of the liquid crystal 200 and also makes its rotation state unstable, since it rotates in a direction opposite to the rotation force of the phase delay layer 201, due to the different rotation direction of the effective phase delay layer 201. That is, a rotation fixed force suppresses the rotation (FIG. 4).

Accordingly, in the related art liquid crystal display, where the ferroelectric liquid crystal layers have different rotation directions, the transmittance versus voltage 2200 is lower than a transmittance versus voltage 2000 of another related art liquid crystal display.

However, in the inventive liquid crystal display where the ferroelectric liquid crystals have the same rotation direction (FIG. 6), an excellent transmittance is provided, and also the transmittance is constantly maintained even at a high voltages by overcoming the drawbacks of the related art liquid crystal displays where the ferroelectric liquid crystals have different rotation directions.

In general, the response speed is determined depending on time required to switch between the darkest state and the brightest state. The response speed is expressed as the time from when voltage is applied or turned off (ON or OFF) based on pixel brightness. Alternately, the response speed is expressed as the rise time and the decay time based on the motion of the liquid crystal molecule.

As shown in FIG. 7B, the X-axis denotes time in milliseconds (ms), and the Y-axis denotes the relative transmittance based on percentage (%). A solid line denotes a variation of transmittance when voltage is applied (ON). A dotted line denotes the variation of a transmittance when voltage is turned off (OFF).

As shown in FIG. 7B, the inventive liquid crystal display, where the ferroelectric liquid crystals have the same rotation direction, has a response speed (2110) when voltage is applied (ON) and a response speed (2120) when voltage not applied (OFF) that are faster than those (2010) with applied voltage (ON) and (2020) when voltage turned off (OFF) of the related art liquid crystal display (where the ferroelectric liquid crystals have the different rotation directions).

As described above, in the related art liquid crystal display where the ferroelectric liquid crystal layers have different rotation directions, the liquid crystal rotates in one direction and then is reverse rotated due to the fixed force, thereby deteriorating the luminance. The liquid crystal again rotates in response to another switching signal, thereby preventing effective phase delay and causing slow response speeds.

In contrast, the inventive liquid crystal display has ferroelectric liquid crystal layers with the same rotation direction, and the inventive ferroelectric liquid crystal thus has a fast response speed by overcoming the above drawback.

As described above, the inventive liquid crystal display provides the following effects.

First, electrodes are respectively provided at the upper and lower substrates, thereby increasing the aperture ratio. Low aperture ration was one of the disadvantages of the related art in-plane driving methods.

Second, the upper and lower ferroelectric liquid crystals have the same rotation direction by utilizing the phase transition properties of the liquid crystal and the applied direct current. The inventive liquid crystal device thus provides effective phase delay, increases the transmittance and reduces the response speed.

Third, even though the ferroelectric liquid crystal has a low impact resistance and can be impacted during the assembly process to have a disordered initial arrangement, the liquid crystal can be easily rearranged by controlling the temperature and again applying a voltage.

It will be apparent to those skilled in the art that various modifications and variations can be made in the invention. Thus, it is intended that the invention covers the modifications and variations of this invention provided they come within the scope of the appended claims and their equivalents.

What is claimed is:

1. A liquid crystal display comprising:
   a first substrate;
   a first alignment layer over the first substrate;
   a first ferroelectric liquid crystal layer over the first alignment layer, and having a polarity in a first direction;
   a second substrate facing the first substrate;
   a second alignment layer over the second substrate;
   a second ferroelectric liquid crystal layer over the second alignment layer, and having a polarity of the same first direction as the first ferroelectric liquid crystal layer; and
   a third liquid crystal layer formed between the first ferroelectric liquid crystal layer and the second ferroelectric liquid crystal layer,
   wherein the third liquid crystal layer has a phase transition from a nematic phase to an isotropic phase when the temperature is raised.

2. The display according to claim 1, wherein the first substrate has a pixel electrode, and the second substrate has a common electrode.

3. The display according to claim 1, wherein the first and second ferroelectric liquid crystal layers have a phase transition from a chiral smectic $\underline{C}$ (SmC*) phase to a chiral nematic (N*) phase when a temperature is raised.

4. The display according to claim 1, wherein the first and second ferroelectric liquid crystal layers have a phase transition from a chiral smectic $\underline{C}$ (SmC*) phase to a smectic A (SmA) phase when a temperature is raised.

5. The display according to claim 1, wherein the third liquid crystal layer is formed of bulk nematic liquid crystal.

6. The display according to claim 1, wherein the first and second ferroelectric liquid crystal layers have chiral smectic $\underline{C}$ (SmC*) phases at a temperature of $T_1$ at which the third liquid crystal layer has a phase transition from a chiral nematic (N*) phase to an isotropic phase.

7. The display according to claim 6, wherein the first and second ferroelectric liquid crystal layers have a phase transition from the chiral smectic $\underline{C}$ (SmC*) phase to a chiral nematic (N*) phase at a temperature $T_2$ higher than the temperature of $T_1$.

8. The display according to claim 6, wherein the first and second ferroelectric liquid crystal layers have a phase transition from the chiral smectic $\underline{C}$ (SmC*) phase to a smectic A (SmA) phase at a temperature $T_2$ higher than the temperature of $T_1$.

9. A method for fabricating a liquid crystal display, the method comprising:
   forming first and second alignment layers over first and second substrates, respectively;
   forming first and second ferroelectric liquid crystal layers over the first and second alignment layers, respectively;
   filling a third liquid crystal layer between the first and second substrates to form a liquid crystal panel;
   heating the liquid crystal panel to a temperature $T_1$ to cause a phase transition of the first and second ferroelectric liquid crystal layers to nematic liquid crystal layers having a chiral nematic (N*) phase and to also cause a phase transition of the third liquid crystal layer to an isotropic liquid crystal layer;
   cooling the liquid crystal panel to a temperature of $T_2$ and applying a direct current voltage to the liquid crystal panel, to cause a phase transition of the first and second ferroelectric liquid crystal layers from the chiral nematic (N*) phase to a chiral smectic $\underline{C}$ (SmC*) phase and maintain the third liquid crystal layer in an isotropic phase; and
   cooling the liquid crystal panel to a temperature $T_3$, to maintain the first and second ferroelectric liquid crystal layers in the chiral smectic $\underline{C}$ (SmC*) phase and to cause a phase transition of the third liquid crystal layer from the isotropic phase to the chiral nematic (N*) phase.

10. The method according to claim 9, wherein when the liquid crystal panel is cooled to the temperature $T_2$ and has a direct current voltage applied thereto, the applied direct current voltage up to 10 volts.

11. The method according to claim 9, wherein the first substrate has a pixel electrode, and the second substrate has a common electrode.

12. The method according to claim 9, wherein when the liquid crystal panel is cooled to the temperature of $T_2$ and has a direct current voltage applied thereto, the first and second ferroelectric liquid crystal layers have polarities in the same direction.

13. A method for fabricating a liquid crystal display, the method comprising:
   forming first and second alignment layers over first and second substrates, respectively;
   forming first and second ferroelectric liquid crystal layers over the first and second alignment layers, respectively;
   filling a third liquid crystal layer between the first and second substrates to form a liquid crystal panel;
   heating the liquid crystal panel at a predetermined temperature of $T_1$ to cause a phase transition of the first and second ferroelectric liquid crystal layers to smectic A (SmA) phase liquid crystal layers and cause a phase transition of the third liquid crystal layer to an isotropic liquid crystal layer;
   cooling the liquid crystal panel to a temperature $T_2$ and applying a direct current voltage to the liquid crystal panel, to cause a phase transition of the first and second ferroelectric liquid crystal layers from the smectic A (SmA) phase to a chiral smectic C (SmC*) phase and maintaining the third liquid crystal layer in an isotropic phase; and
   cooling the liquid crystal panel to a temperature of $T_3$, to maintain the first and second ferroelectric liquid crystal layers in the chiral smectic C (SmC*) phase and cause a phase transition of the third liquid crystal layer from the isotropic phase to a chiral nematic (N*) phase.

14. The method according to claim 13, wherein when the liquid crystal panel is cooled to the temperature of $T_2$ and has the direct current voltage applied thereto, the applied direct current voltage is up to 10 volts.

15. The method according to claim 13, wherein the first substrate has a pixel electrode, and the second substrate has a common electrode.

16. The method according to claim 14, wherein when the liquid crystal panel is cooled to the temperature $T_2$ and has a direct current voltage applied thereto, the first and second ferroelectric liquid crystal layers have polarities in the same direction.

* * * * *